US008296067B2

(12) United States Patent
Ross et al.

(10) Patent No.: US 8,296,067 B2
(45) Date of Patent: Oct. 23, 2012

(54) SATELLITE COMMUNICATIONS WITH CABLELESS SEISMOGRAPHS (75) Inventors: Allan A. Ross, Houston, TX (US); Michael Pfister, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 632 days.

(21) Appl. No.: 12/405,869

(22) Filed: Mar. 17, 2009

(65) Prior Publication Data

US 2009/0234585 A1  Sep. 17, 2009

Related U.S. Application Data (60) Provisional application No. 61/037,244, filed on Mar. 17, 2008.

(51) Int. Cl.
G06F 15/00 (2006.01)
(52) U.S. Cl. ............. 702/14; 702/150; 367/76; 367/16; 367/19; 342/357.27; 342/357.29
(58) Field of Classification Search ............ 702/14, 702/150; 340/870.15, 825.36; 367/76, 77, 367/16, 78, 79, 55, 184, 183, 182, 19, 13; 342/352, 357.01, 357.13, 357.17, 450, 417, 342/360, 357.12, 443; 370/331; 455/451, 455/452.1; 73/1.85
See application file for complete search history.

(56) References Cited

U.S. PATENT DOCUMENTS

| | | | |
|---|---|---|---|
| 5,623,455 A * | 4/1997 | Norris | 367/76 |
| 5,627,798 A * | 5/1997 | Siems et al. | 367/76 |
| 5,793,813 A | 8/1998 | Cleave | |
| 6,041,283 A | 3/2000 | Sigmar et al. | |
| 6,188,963 B1 * | 2/2001 | Paffenholz | 702/17 |
| 6,560,565 B2 | 5/2003 | Roy et al. | |
| 6,944,096 B2 * | 9/2005 | Lemenager et al. | 367/77 |
| 7,269,095 B2 * | 9/2007 | Chamberlain et al. | 367/76 |
| 7,376,045 B2 * | 5/2008 | Falkenberg et al. | 367/19 |
| 7,383,151 B2 * | 6/2008 | Berg et al. | 702/150 |
| 7,583,560 B2 * | 9/2009 | Chamberlain et al. | 367/76 |
| 7,660,695 B2 * | 2/2010 | Berg et al. | 702/150 |
| 7,671,598 B2 * | 3/2010 | Ronaess et al. | 324/365 |
| 7,813,221 B2 * | 10/2010 | Barakat et al. | 367/76 |
| 7,929,379 B2 * | 4/2011 | Kamata et al. | 367/184 |
| 2004/0103139 A1 | 5/2004 | Hubbard et al. | |
| 2005/0027453 A1 | 2/2005 | Fort et al. | |
| 2006/0009911 A1 | 1/2006 | Burkholder et al. | |
| 2007/0025365 A1 | 2/2007 | Sagot et al. | |
| 2007/0036031 A1 * | 2/2007 | Barakat et al. | 367/76 |
| 2007/0091719 A1 * | 4/2007 | Falkenberg et al. | 367/19 |
| 2007/0225944 A1 | 9/2007 | Knutsen | |
| 2007/0253289 A1 * | 11/2007 | Chamberlain et al. | 367/51 |
| 2007/0286023 A1 * | 12/2007 | Bull et al. | 367/59 |

(Continued)

OTHER PUBLICATIONS

Durham, "A Wireless Future? Cables Can Tangle Seismic Plans", Sep. 6, 2007, Publisher: AAPG Explorer.

(Continued)

*Primary Examiner* — Carol Tsai
(74) *Attorney, Agent, or Firm* — Albert K. Shung (57) ABSTRACT According to a preferred aspect of the instant invention, there is provided a system and method for using satellite communications satellites to control and receive data from a land cableless seismic system. The satellite transmission could transmit control signals (e.g. turn on/off) and receive signals from the remote seismograph units (seismic data, quality control parameters, status, location, etc.) which would subsequently be retransmitted to a processing center or other surface facility.

4 Claims, 5 Drawing Sheets

U.S. PATENT DOCUMENTS

| | | | | |
|---|---|---|---|---|
| 2007/0293149 | A1* | 12/2007 | Wubker | 455/13.2 |
| 2008/0189044 | A1* | 8/2008 | Chamberlain et al. | 702/14 |
| 2008/0219094 | A1 | 9/2008 | Barakat | |
| 2008/0227446 | A1* | 9/2008 | Wubker | 455/427 |
| 2009/0141587 | A1* | 6/2009 | Welker et al. | 367/16 |
| 2010/0017139 | A1* | 1/2010 | Adams et al. | 702/14 |
| 2010/0195439 | A1* | 8/2010 | Muyzert | 367/56 |

OTHER PUBLICATIONS

Cambois, "Cost-Effective Acquisition of Land Seismic Data: Can It Be Done?", Aug. 2000, Publisher: The Leading Edge, Published in: US.

Hill, et al., "High-Resolution Multisensor Geophysical Surveys for Near-Surface Applications Can Be Rapid and Cost-Effective", Jul. 2004, pp. 684-688, Publisher: The Leading Edge, Published in: US.

Cambois, "Instrumentation or How Many Sows' Ears Does It Take to Make a Silk Purse?", Sep. 2002, Publisher: The Leading Edge, Published in: US.

Bland, "A Loss-Resistant Method of Seismic Data Transmission Over Wireless Data Networks", 2004, pp. 1-6, vol. 16, Publisher: Crewes Research Report, Published in: US.

Bland, et al., "Remote, Wireless, Permanent Seismic Stations: A Mountain Case", 2004, pp. 1-9, vol. 16, Publisher: Crewes Research Report, Published in: US.

Chimblo, "Issues Related to Reduced Cost and Increased Productivity in Acquisition, Processing and Integration of 3-D Seismic Data", Nov. 1995, Publisher: The Leading Edge, Published in: US.

Jack, "Seismic System 2000", Oct. 1996, Publisher: The Leading Edge, Published in: US.

Wireless Seismic, Wireless Exploration Seismograph, Publisher: www.wirelessSeismic.com, 2006-2011, Wireless Seismic Inc., 2 pages.

RS-100 RadioSeis Wireless Seismic System, Printout from http://seistronix.com/download/rs100ds1.pdf, Jan. 2001, Seistronix, CA, 2 pages.

Ozdogan Yilmaz, "Seismic Data Processing", Society of Exploration of Geophysicists, 1987, Chapter 1, pp. 9-81, Tulsa, Oklahoma, USA.

Ozdogan Yilmaz, "Seismic Data Processing", Society of Exploration of Geophysicists, 1987, Chapter 6, pp. 384-427, Tulsa, Oklahoma, USA.

* cited by examiner

SATELLITE COMMUNICATIONS WITH CABLELESS SEISMOGRAPHS

CROSS REFERENCE TO RELATED CASES

This application claims the benefit of U.S. Provisional Patent Application Ser. No. 61/037,244, filed on Mar. 17, 2008, and incorporates said provisional application by reference into this disclosure as if fully set out at this point.

TECHNICAL FIELD

This invention relates to the general subject of seismic exploration and, in particular, to methods for collecting seismic data for use in quantifying and visualizing complex subsurface structures.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single line, whereas in a three dimensional (3D) survey the recording locations are distributed across the surface, traditionally as a series of closely spaced adjacent two-dimensional (2D) lines. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. (Chapter 1, pages 9-89, of *Seismic Data Processing* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be taken extracted from a stacked or unstacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2D seismic line from within the 3D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

However, for all of the advances that have been made in recent years in the technology of seismic processing, the resulting image of the subsurface is often compromised by the ability to get geophones into position to receive the returning subsurface signals. In more particular, in rugged terrain it may be difficult to maneuver a conventional seismic line into position so that receivers can be placed where they need to be in accordance with the survey plan. Additionally, as the length of the seismic line increases (because of increased geophone spacing, increased number of channels, and/or longer offsets) the weight of the cable that connects each geophone (or geophone array) to a central recording unit becomes increasingly burdensome and more difficult to maneuver. The net result of the above is poorer coverage (because of missing receivers) in rugged terrain and increased expense.

Of course, this aspect of seismic data collection has long been understood. It was recognized early on that if it were possible to eliminate the interconnecting cable (other things being equal) the deployment and retrieval costs would be substantially less and, in some cases, fewer field personnel would need to be employed. In view of these and other advantages, it is not surprising that there have been numerous attempts to create a wireless system. However, current solutions to this problem have not proven to be entirely satisfactory.

The state of the art in wireless (or cableless) systems involves the use of two-way radio communications between geophones and a central recording facility. In simplest terms, radio-based wireless systems equip each geophone (or seismograph) with its own power supply and a radio transmitter/receiver (i.e., "transceiver"). Seismic signals that are recorded by each geophone are transmitted to a central receiver (which is a transceiver in most instances) for recording onto magnetic tape or disk (a base station, hereinafter). Additionally, each geophone might be equipped with some amount of RAM (or flash RAM, disk, etc.) in which to store the in-coming seismic data until such time as it can be transmitted to the central recording facility for long-term storage. It should be noted that in most circumstances there is insufficient bandwidth to simultaneously stream the seismic data from all of the (potentially many thousands of) geophones at once. Instead, in most cases each receiver has enough internal storage to record at least a few shots before needing to transmit to base station.

In many systems, the base station also transmits commands to each seismograph. These commands might include simple directives such as "start recording", "start/stop recording", "sleep" (i.e., switch to power saving mode), "wake", etc. Additionally, it is not uncommon to configure the seismographs to respond to commands such as "send status", "begin upload", etc., where a reply from the seismograph is expected. Among the sorts of replies that might be transmitted include verification of electrical integrity, available storage levels, "help me I'm broken", etc.

Communication between the recording station and remote seismographs (e.g., "field units", "channels") is obviously more difficult with wireless systems than it is with conventional cabled systems. Typically, transmission of control signals, timing signals, electrical performance data, quality control information, seismic data, etc. must either be foregone or restricted and, in some cases, such information can only be transmitted via a separate radio system (includes wireless LANs). Thus, alternative solutions have been, and continue to be, sought.

Among the alternative approaches that have been tried are low frequency transmitters/receivers and WiFi. However, there are problems with these sorts of approaches. As an example, since a typical seismic survey may utilize several thousand geophones at any one time transferring the data from each geophone to the base station can prove to be problematic. In the case of a WiFi approach, communications tend to break down when thousands of receivers try to transmit seismic data simultaneously to a base station. In brief, neither of these methods has been particularly successful.

Another disadvantage of land cableless seismic systems is that the remote seismographs are easily stolen. The loss of the instrument is serious enough, but the cost of the data stored within the memory is typically hundreds or thousands of times greater than the cost of the instrument.

Of course, a land cableless seismic system has less weight, lower capital investment requirements, and generally lower operating costs. Finally, cableless systems are much preferred over cabled systems as they have a reduced impact on the environment. Obviously, laying out (which may require some foliage reduction) and then collecting miles of heavy seismic cables has an increased potential to damage vegetation and other aspects of the wilderness environment as compared with cableless system, thus making them increasingly attractive.

Heretofore, as is well known in the seismic processing and seismic interpretation arts, there has been a need for a cableless seismic system that does not suffer from the disadvantages of the prior art. Accordingly, it should now be recognized, as was recognized by the present inventor, that there exists, and has existed for some time, a very real need for a method of seismic data acquisition that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided a system and method for using satellite communications satellites to monitor and control land cableless seismic systems. The satellite transmission will preferably transmit control signals (e.g. turn on/off) and receive data signals from the remote seismic sensor units (seismic data, quality control reports, status, performance parameters, location, etc)

In additional preferred embodiments, seismic data may be sent from the seismic sensor units back to a base station via satellite. In a preferred arrangement, each seismic unit will have its own geophone, CPU, storage, and satellite transceiver. In the preferred arrangement, seismic data will be collected and stored locally until bandwidth is available for its transmission via the transceiver to a satellite and then on to a processing center or other ground station. Data compression/decompression will preferably be used to reduce the bandwidth requirements. Similarly and preferably, control information will be received from the satellite via a satellite receiver.

One advantage of the instant approach is that it is less susceptible to local terrain variations than would be the case with conventional RF-based systems. More particularly, rugged terrain can create radio shadow zones, e.g., areas where the radio signal from one or more seismographs cannot be detected at the base station. This might be due to terrain, foliage, federal or other restrictions on broadcast power, etc. Of course, equipping each field unit with a radio adds cost, weight and increases the power requirements for that unit.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

GENERAL ENVIRONMENT OF THE INVENTION

Figure 1:
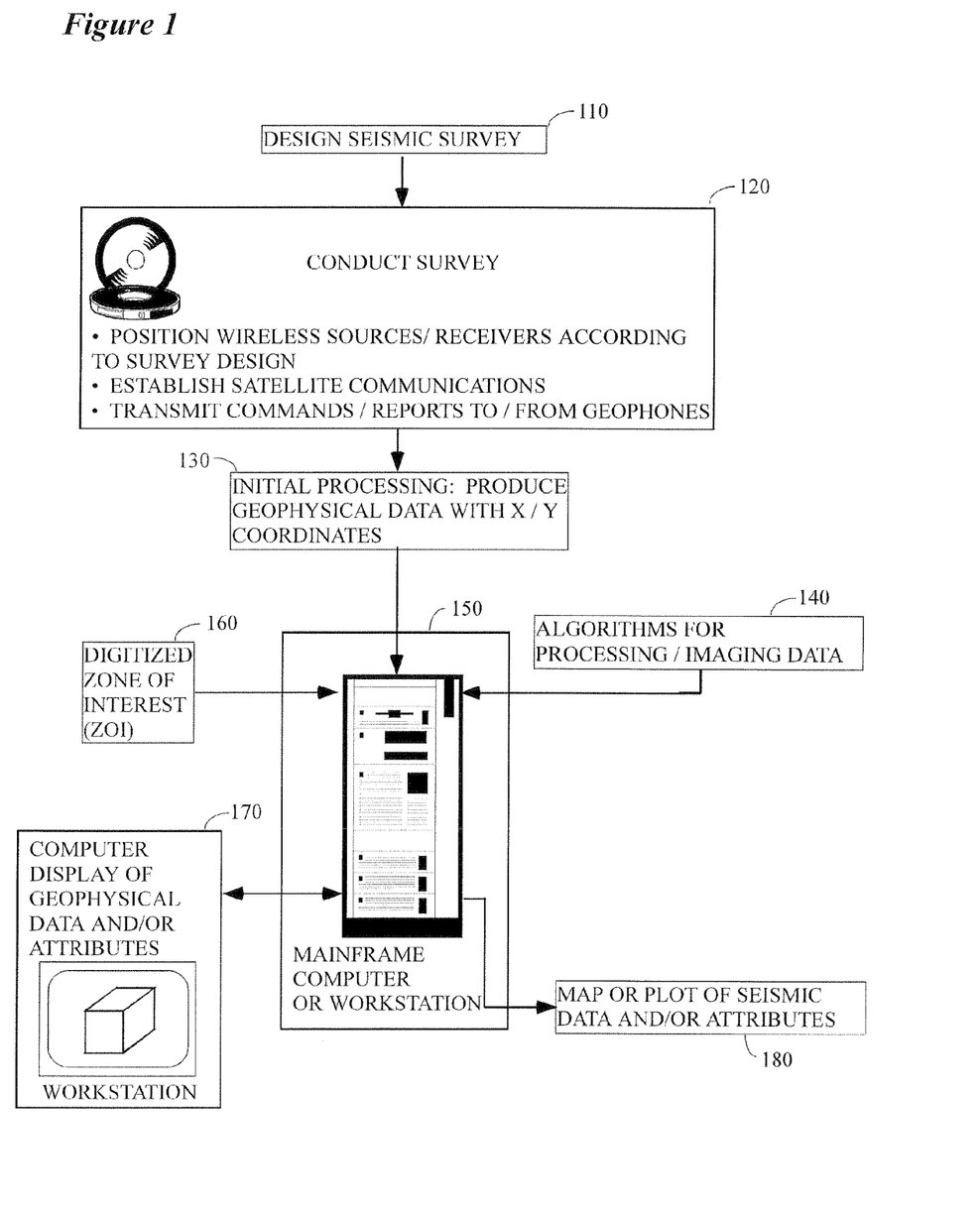
FIG. 1 illustrates a general environment of the instant invention.

FIG. 1 illustrates the general environment in which the instant invention would typically be used. Seismic data 110 are collected in the field over a subsurface target of potential economic importance and are typically sent thereafter to a processing center or other ground station. Seismic surveys might be conducted on either land or water, but for purposes of the instant invention land acquisition only will be considered. It should be noted that the instant invention would typically be utilized during step 120 of this figure.

In the field, each receiver (or receiver group) in a conventional seismic survey gives rise to one seismic trace each time the source is activated and the raw/unprocessed traces are typically written to a mass storage medium (e.g., magnetic tape, optical disk, etc.) for transmission to the processing center. In the processing center a variety of preparatory processes 140 are typically applied to the seismic traces to prepare them for a wide range of processing and imaging steps that conventionally follow. See, for example, steps 215 and 220 of FIG. 2 for some examples of these sorts of processes. The seismic traces (before, during, and after initial processing) might be stored, by way of example only, on hard disk, magnetic tape, magneto-optical disk, DVD disk, or other mass storage means. Note that it is conventional to associate each seismic trace with its position on the surface of the earth at the time the source was activated (step 130) and, by way of example only, this is often done during the preparatory processing step 130.

In the processing center, a variety of signal conditioning and/or imaging steps are typically performed. In the preferred arrangement, these steps will take the form of computer programs 140 that have been loaded onto a general purpose programmable computer 150 where they are accessible by a seismic interpreter or processor. Note that a general purpose computer 150 would typically include, in addition to mainframes and workstations, computers that provide for parallel and massively parallel computations, wherein the computational load is distributed between two or more processors.

As is further illustrated in FIG. 1, in the preferred arrangement some sort of digitized zone of interest model 160 is often specified by the user and provided as input to the processing computer programs. This zone of interest might correspond to a particular reflector or layer in the subsurface that is believed to trap or contain hydrocarbon resources. In the case of a 3D seismic section, the zone of interest 160 would typically include specifics as to the lateral extent and thickness (which might be variable and could be measured in time, depth, frequency, etc.) of a subsurface target. The exact means by which such zones are created, picked, digitized, stored, and later read during program execution is unimportant to the instant invention and those of ordinary skill in the art will recognize that this might be done any number of ways.

Figure 2:
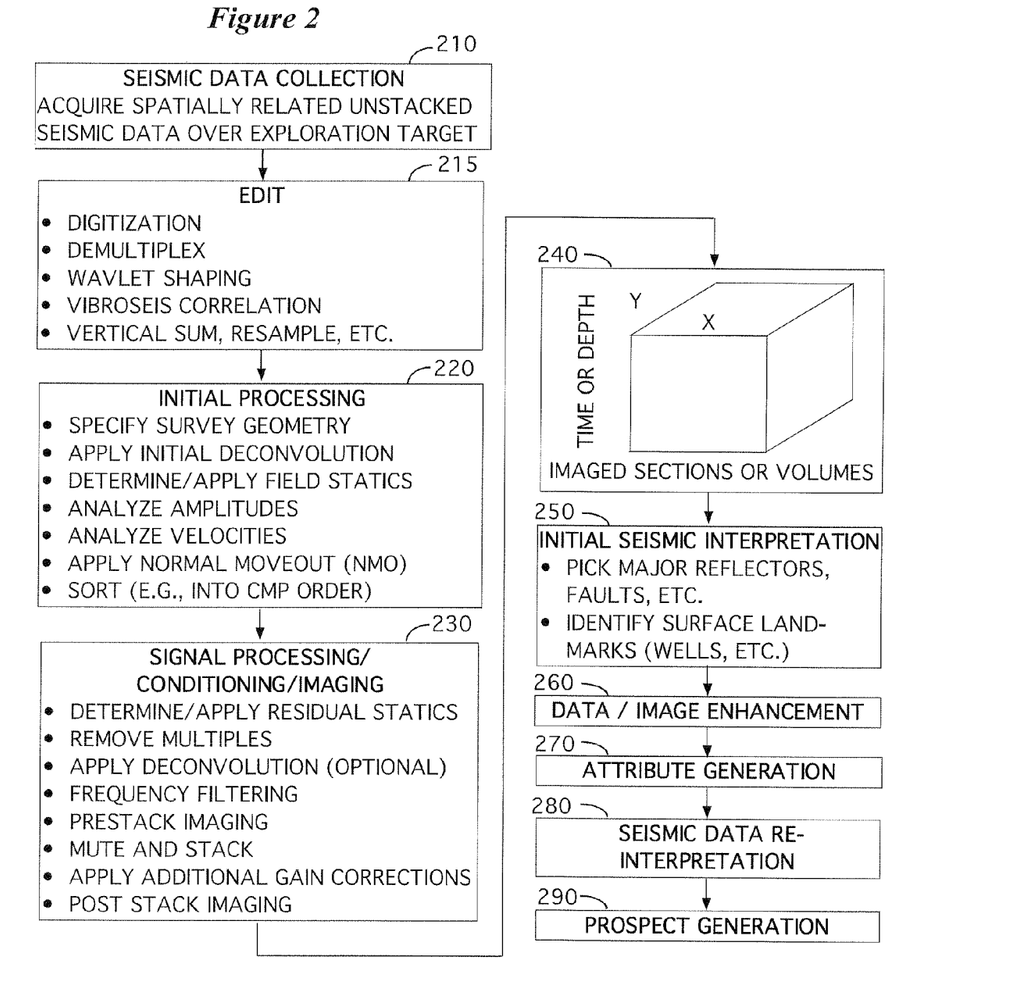
FIG. 2 a schematic illustration of a seismic data processing flow chart of the sort that would preferably be used in connection with seismic data that has been collected via the instant invention.

Seismic processing programs 140 might be conveyed into the computer that is to execute them by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network. In a typical seismic processing environment, the various numerical treatments that are applied to the seismic data would be made part of a package of software modules that is designed to perform many of the processing steps listed in FIG. 2. Note that FIG. 2 is a generalized processing scheme that is suitable for use with land or marine data. Of course, since the preferred embodiment of the instant invention is land in nature, those of ordinary skill in the art will understand that marine data processing steps in FIG. 2 would not typically be applicable. Thus, the steps in FIG. 2 should be understood to be illustrative of a general processing scheme that would be suitable for either land or marine data, and not a processing scheme that would be utilized for every sort of data.

Returning to FIG. 1, the processed seismic traces would then typically be sorted into CMP gathers (3-D data will typically be binned), stacked, and displayed either at a high resolution color computer monitor 170 or in hard-copy form as a printed seismic section or a map 180. The seismic interpreter would then use the displayed images to assist him or her in identifying subsurface features conducive to the generation, migration, or accumulation of hydrocarbons.

As was indicated previously, seismic traces that have been acquired according to the instant invention will preferably be subjected to the seismic processing to improve their usefulness. Those of ordinary skill in the art will understand the sorts of processes that are typically applied to seismic data and that the particular algorithm(s) involved, may vary markedly depending on the individual seismic processor, the signal source (dynamite, vibrator, etc.), the survey location (land, sea, etc.) of the data, the company that processes the data, etc.

Turning now to FIG. 2, wherein some preferred seismic processing steps are illustrated, as an initial step a 2D or 3D seismic survey is conducted according to the instant invention over a particular volume of the earth's subsurface (step 210).

The data collected in the field consist of unstacked (i.e., unsummed) seismic traces which contain digital information representative of the volume of the earth lying beneath the survey. Preferably the data will be have been collected according to the instant invention but the general processing scheme that follows would be applicable to data from a wide variety of sources.

A central goal of a seismic survey is to acquire a collection of spatially related seismic traces over a subsurface target of some potential economic importance. Seismic traces that are acquired by the methods taught herein might be utilized in the form of stacked or unstacked 2-D seismic lines, stacked or unstacked 3D seismic volumes, etc. The invention disclosed herein is most effective when used to acquire a 3-D seismic survey that has an underlying spatial relationship with respect to some subsurface geological feature.

After the seismic data are acquired (step 210), they are typically taken to a processing center where some initial or preparatory processing steps are applied to them. As is illustrated in FIG. 2, a common early step 215 is designed to edit the input seismic data in preparation for subsequent processing (e.g., demux, gain recovery, wavelet shaping, bad trace removal, etc.). This might be followed by specification of the geometry of the survey (step 220) and storing of a shot/receiver number and a surface location as part of each seismic trace header. Once the geometry has been specified, it is customary to perform a velocity analysis and apply an NMO (normal move out) correction to correct each trace in time to account for signal arrival time delays caused by offset between the source and receiver.

After the initial pre-stack processing is completed, it is customary to condition the seismic signal on the unstacked seismic traces before creating stacked (or summed) data volumes (step 230). In FIG. 2, step 230 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is the production of a stacked seismic volume or, in the case of 2D data, a stacked seismic line for use in the exploration for hydrocarbons within the subsurface of the earth.

As is suggested in FIG. 2, any digital sample within a stacked seismic volume is uniquely identified by a (X, Y, TIME) triplet, with the X and Y coordinates representing some position on the surface of the earth, and the time coordinate measuring a recorded arrival time within the seismic trace (step 240). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques.

The explorationist may do an initial interpretation 250 of the resulting stacked volume, wherein he or she locates and identifies the principal reflectors and faults wherever they occur in the data set. This might be followed by additional data enhancement 260 and/or attribute generation (step 270) of the stacked or unstacked seismic data. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

PREFERRED EMBODIMENTS

According to a first preferred embodiment, there is provided a land cableless seismic system that is an alternative to conventional terrestrial radio acquisition systems. In more particular, according to the preferred embodiment there is provided a cableless system in which a commercial satellite constellation will be used to communicate with each field unit. In the preferred embodiment, low altitude, low cost, high capacity satellite systems will be utilized. Preferably, these will be selected so as to provide full time coverage over the remote areas in which seismic surveys tend to be performed. For example, Geos Alliance™ (www.geosalliance.com) is a group of companies on several continents that have cooperated to provide access to a low cost, low altitude satellite system that can provide location, messaging and search and rescue services suitable for use with the instant invention.

In one preferred embodiment, the hardware necessary to implement two-way satellite communications will be obtained by purchase of off-the-shelf hardware. For example, the ground unit of a commercially available satellite communication system of the sort useful with the instant invention can typically be found within a personal locator beacon, a small, inexpensive handheld unit that transmits the users location (derived from GPS satellites) and a message to the communications satellite system (for example, www.findmespot.com describes a satellite-based personnel tracker). The location systems send the user's coordinates and messages to a ground station, where they are relayed to either an emergency responder, or merely inserted into an email stream if there is no emergency.

In one preferred embodiment, to exploit the satellite capabilities for purposes of the instant invention, the circuitry typically included within a personal locator beacon will be incorporated into each remote seismic unit. Thus enabled, the stations/field units will preferably receive control signals from the satellite system, and pass data to the satellite system, such as performance parameters, quality control variables, seismic data, and sensor location. Among the sorts of information that might be passed to the field units are codes that signal a request for status checks, an ON/OFF command (e.g., switch between "sleep" and "wake"), start recording, end recording etc. Among the sorts of information that might be passed from the field units back to the satellite includes status reports (including available storage levels, status of electronics, etc.), requests for attention (ready to upload, problem encountered, etc.), current location (e.g., via GPS), etc.

Adding an ability to determine location via GPS would be advantageous if for no other reason than time synchronization (e.g., using GPS timing) between the base station and field units. That being said, those of ordinary skill in the art will recognize that timing and/or control signals need not come via GPS but could, for example, originate from the satellite via broadcast of micro or millisecond timing signals. In other preferred variations, the timing and/or control signals might be transmitted from a terrestrial base station. Finally, the timing signal could be local to each station (e.g., time might be obtained from an oscillator that is made to be a part of each seismograph).

Additionally, if a field unit were to be stolen or lost, the GPS data contained within each message that is preferably transmitted back to the satellite could easily lead to its location for recovery. Finally, in some cases, data compression/decompression will be used to transmit some or all of the seismic data from the field units back to the satellite and then on to the processing center or other base station.

Figure 3:
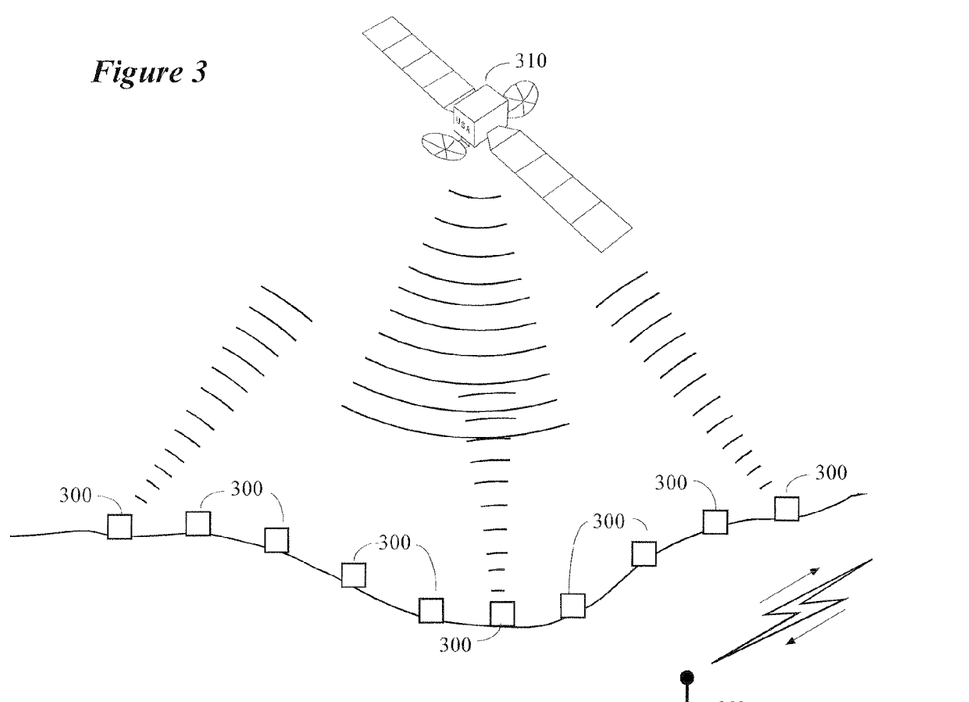
FIG. 3 illustrates schematically how each seismograph communicates to an orbiting satellite and, similarly, receives commands therefrom.
Figure 7:
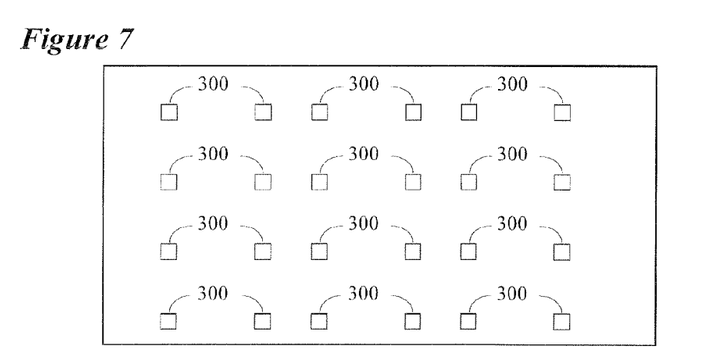
FIG. 7 contains a plan view of a portion of a typical seismic survey of the sort suitable for use with the instant invention.

Turning now to the figures, FIG. 3 contains a schematic illustration of a preferred embodiment of the instant invention. In this figure, there are numerous seismic stations 300, each of which preferably comprises a seismic sensor (e.g., a geophone, a hydrophone, etc.), a CPU, and a satellite transceiver. Note that it is well known in the art to distribute multiple seismic sensors in a linear (or planar) pattern and then record the response of the entire group of phones, thereby creating a receiver array. For purposes of the instant disclosure, such an array will be considered to be a single seismic sensor. Although FIG. 3 might suggest that the seismic stations 300 were deployed in a linear pattern, that is not required at all and, in fact, it is preferred that a 2D pattern be employed as is suggested by the plan-view in FIG. 7. Of course, such 2D patterns are well known to yield 3D seismic datasets.

As is suggested by FIG. 3, in the preferred arrangement each station 300 will be equipped with a transceiver for communicating with satellite 310. That being said, at minimum each station 300 will be equipped with a transmitter for sending seismic data to the satellite 310. Being able to receive control signals from the satellite 310 or elsewhere would be useful in many instances, in which case a transmitter and a receiver would preferably be incorporated into each station 310. Note that it is not essential that the control information be transmitted to each station 300 by satellite, although that is preferred. Thus, when the term "transceiver" is used herein, that term should be broadly construed to include any combination of a ground-to-satellite transmitter and a receiver for reception of control information, whether or not the control information is transmitted from a ground station or via satellite. Further, it should be noted that the satellite 310 might be a single communications satellite or multiple satellites. Thus, when the term "satellite" is used herein, that term should be interpreted to be singular or plural as the situation merits.

Figure 5:
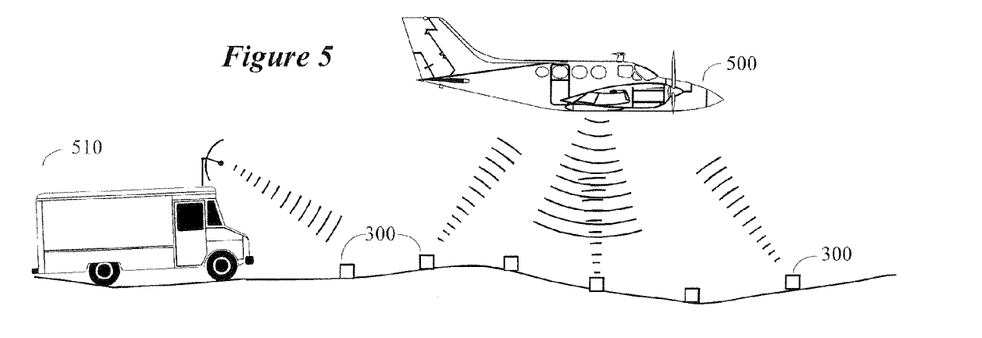
FIG. 5 illustrates a preferred method wherein an airplane (or helicopter, etc.) periodically passes over the field and collects or transmits seismic and other data from the seismometers.

Note that, although this figure does not represent every one of the stations 300 as transmitting (i.e., only the first, last, and center stations 300 are represented schematically as transmitting), it is a requirement of the instant invention that each station be able to communicate with satellite 310. Further, and as is suggested by this figure, in some embodiments transmissions to the satellite by the stations 300 will be staggered to because of limitations on bandwidth. In some preferred embodiments, a plane 500 or helicopter might fly over the field and collect data from the stations 300 (FIG. 5). However, in the preferred embodiment satellite communications will be used.

Figure 4:
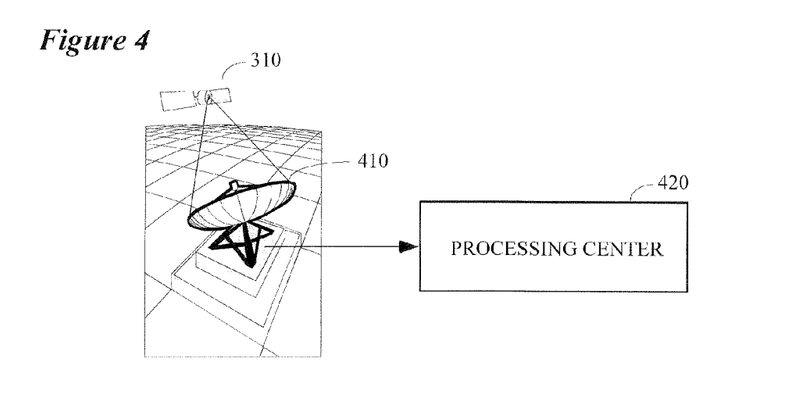
FIG. 4 contains a schematic illustration of how the satellite relays seismic and other data to a processing center.

As is indicated in FIG. 4, the satellite 310 will relay the field seismic data from the seismic stations 300 to a terrestrial antenna 410 and then on to a processing center 420 or other ground station. It will similarly pass command instructions to the stations 300 (e.g., "start recording", "stop recording", "sleep", "wake", "send status", "begin upload", etc.) and receive replies therefrom (e.g., "ready", "end of data", "equipment failure", etc.). As is indicated in FIG. 5, preferably this function (i.e., communication of control signals) will be handled by the satellite 300, but in some variations the command signals might be transmitted from a ground-based station (e.g., truck 510).

Figure 6:
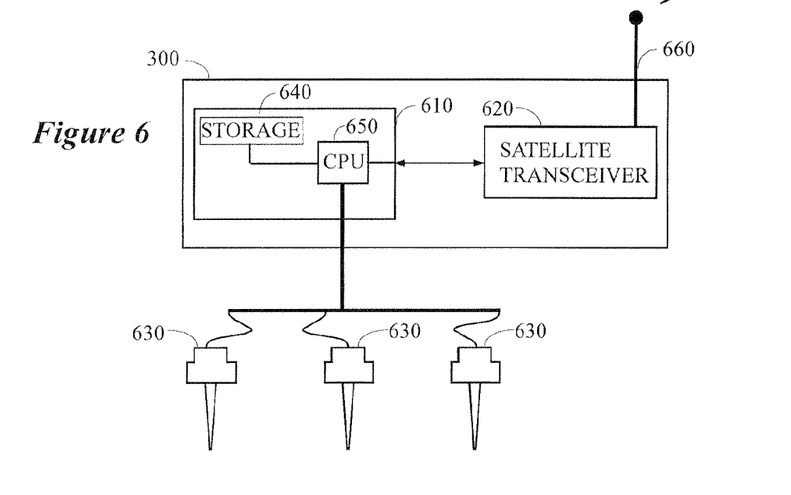
FIG. 6 contains a more detailed view of the various components that comprise a preferred embodiment of the instant invention.

FIG. 6 contains a schematic representation of a preferred station 300 that would be suitable for use with the instant invention. Preferably, the station 300 will consist of three major components which may or may not be located within a single enclosure. First, the station 300 will be in electronic communication with one or more seismic sensors 630. Preferably, the sensors 630 will be geophones, but other sensors might also be used. Consider, for example, a survey that is taken in a densely wooded swamp. In that case some of the sensors might necessarily be hydrophones, depending on the local environment where they are placed. Note that the sensors 630 might be, for example, conventional single axis geophones or multicomponent phones.

Additionally, it should be noted that in some preferred variations a single sensor 630 (e.g., geophone or hydrophone) will be associated with each station 300. However, it is certainly possible that multiple sensors 630 might be configured to form a small (or large) surface array, with the output from the multiple geophones being combined to yield a single seismic trace.

A second key component of the instant invention 300 is a computer 610. Preferably, the computer will have some sort of CPU 650 and have access to some amount of storage 640, which might be conventional (i.e., static) RAM, nonvolatile RAM, flash RAM, magnetic or optical disk, etc. That being said, preferably the storage 640 will be nonvolatile RAM. Preferably, the CPU 650 will be in electronic communication with each of the sensors 630 and will be responsible for converting the analog signals from the sensor(s) 630 into digital signals, if that should be necessary. Note that the CPU 650 might be a microprocessor, a microcontroller, a processor, a gate array, or any other programmable device. Further, it is possible that the functionality of CPU 650 might be distributed between two or more programmable devices (e.g., one chip might handle input and storage of the seismic data stream and another might handle communications with the transceiver 620). Thus, for purposes of the instant disclosure the term "CPU" should be broadly construed to cover both the singular and the plural and should include single chip programmable devices that handle all computing functions, as well as instances where multiple CPUs are used to implement the instant invention.

The third major preferred component of the instant invention is the satellite transceiver 620 including its antenna 660. The transceiver 620 will necessarily be in electronic communication with the computer 610 and will handle communication to and from the satellite 310. In the preferred arrangement, the CPU 650 will receive instructions from the transceiver 620 and transfer seismic data thereto upon command. Of course, control of the seismic stations 300 and communications satellite 310 will ultimately be handled from the processing center 420 or other location.

Figure 8:
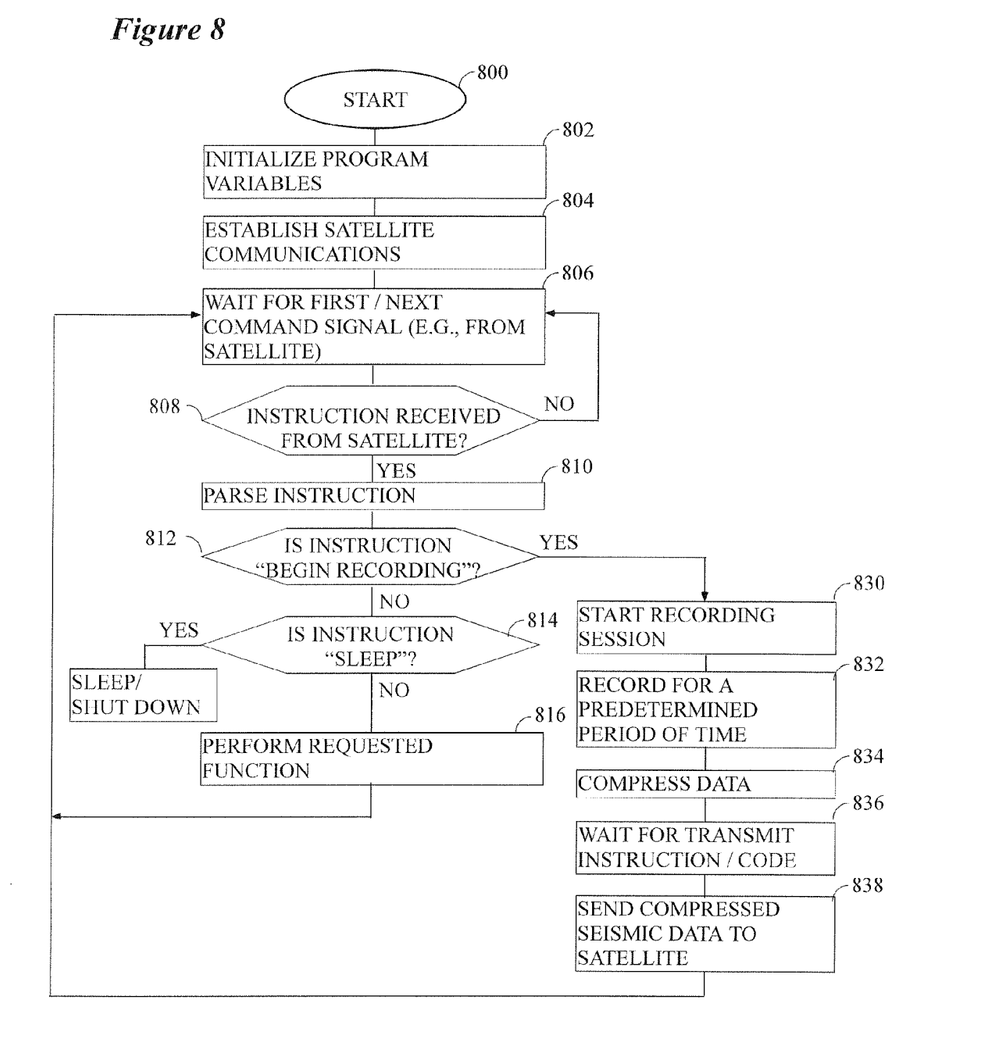
FIG. 8 contains an operating logic suitable for use with the instant invention.

Finally, and turning now to FIG. 8, according to a preferred operating logic suitable for use with the instant invention within station 300, the computer 610 will preferably respond to its instructions after startup (step 800) and initialize its program variables 802. A next preferred step would be to establish communications with the satellite (step 804). If such a connection cannot be established, the instant station 300 will preferably wait for some predetermined period of time and then try to establish communications again. Failing that, an alarm (e.g., an audible alarm, radio transmission, etc.) might be initiated.

As a next preferred step 806, the instant invention will wait for instructions from the satellite or other source of command signals. Note that, in the preferred embodiment, each station 300 will be assigned a unique serial number or other designation. In this scenario, each station 300 would be individually addressable. For example, a command instruction could be accompanied by a specific station designation (which could indicate, for example, that the transmitted command should be executed only by that specific station) or it could be accompanied by a general code or designation that will be interpreted as applying to every station 300 (e.g., a "wake up" command might be intended for receipt by all of the stations 300).

If an instruction is sensed (step 808) by the station, it will preferably be parsed (step 810) and executed. If the transmitted code instructs the unit to begin recording signals (step 812), the instant invention will preferably immediately (or after a predetermined or other time delay) begin to record signals from the attached geophone(s) or other seismic sensing devices (step 830). The recording might continue for a predetermined period of time (e.g., a few seconds, step 832) or until a "STOP" command is received, etc.

Next, and preferably, the recorded seismic data will be compressed (step 834) to reduce its size according to methods well known to those of ordinary skill in the art. This might be done for many reasons, but a preferred reason for doing this would be to reduce the bandwidth that will be required to transmit the recorded seismic data up to the satellite (step 838). The compression algorithm might be either lossy or lossless, with the later being preferred. That being said, this is an optional step and will be performed or not according to the needs of the user.

In some preferred variations, the instant seismic station will wait for an instruction (step 836) before transmitting its data to the satellite. Because of the large number of receivers that will typically be involved, it is anticipated that all of the stations may not be able to transmit simultaneously. Of course, if the bandwidth is available for the stations to all transmit simultaneously, that would be recommended in order to reduce the potential for downtime due to transmission delays.

If an instruction that is different from those described by way of example above is received, such will preferably be executed (step 816) according to the programming of the station.

In some preferred embodiments, the "start recording" command will precede the activation of one or more seismic sources. Of course, it might be desirable in some instances to stagger the start of recording by each sensor as a function of offset, but that would not be the preferred approach.

It would be expected that the recording would typically continue for a predetermined period of time after receipt of a command to start recording (e.g., 4 seconds) or until the returning reflections are below some amplitude threshold. Of course, the term "source activation" should be broadly interpreted to include traditional active seismic sources (e.g., dynamite, Vibroseis®, air guns, etc.) as well as passive or ambient seismic sources. In the event that passive sources are utilized, it is anticipated that much longer recording periods would typically be required.

Obviously, if a command to "shut down" or sleep is received (the "YES" branch of decision item 814) no further parsing will preferably be done, except possibly in instances where the instant invention will continue to monitor thereafter for a "wake up" signal.

Note that one advantage of the instant invention is that it would be less susceptible to communications shadows due to local topographic changes. Since the preferred satellite position is high in the sky, all that will be required in many cases is to position each field unit so that it can see the sky. This requirement will eliminate many of the dead zones that are common with conventional radio wireless systems.

CONCLUSIONS

As has been indicated previously, it is preferred that one or more microprocessors be utilized in constructing the instant invention. Of course, those of ordinary skill in the art will recognize that if a microprocessor is utilized as a component of the instant invention, the only requirement that such a component must satisfy is that it must minimally be an active device, i.e., one that is programmable in some sense to handle data collection, storage, transmission, etc. Of course, these sorts of modest requirements may be satisfied by any number of programmable logic devices ("PLD") including, without limitation, gate arrays, FPGA's (i.e., field programmable gate arrays), CPLD's (i.e., complex PLD's), EPLD's (i.e., erasable PLD's), SPLD's (i.e., simple PLD's), PAL's (programmable array logic), FPLA's (i.e., field programmable logic array), FPLS (i.e., fuse programmable logic sequencers), GAL (i.e., generic array logic), PLA (i.e., programmable logic array), FPAA (i.e., field programmable analog array), PsoC (i.e., programmable system-on-chip), SoC (i.e., system-on-chip), CsoC (i.e., configurable system-on-chip), ASIC (i.e., application specific integrated chip), etc., as those acronyms and their associated devices are known and used in the art. Further, those of ordinary skill in the art will recognize that many of these sorts of devices contain microprocessors integral thereto. Additionally, those of ordinary skill in the art will recognize that discrete electronic components could be assembled to create a circuit that exhibits at least a portion of the operating function of the instant invention. Thus, for purposes of the instant disclosure the terms "processor," "microprocessor" and "CPU" (i.e., central processing unit) should be interpreted to take the broadest possible meaning herein, and such meaning is intended to include any PLD or other programmable device (to include custom circuitry formed from digital and/or analog components and multiple active devices working together in concert) of the general sort described above.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:
1. A method of seismic data collection, comprising the steps of:
   (a) distributing a plurality of seismic sensors over a predetermined volume of the earth;
   (b) transmitting at least one command code to each of said plurality of seismic sensors, thereby initiating a recording session by each of said plurality of seismic sensors;
   (c) initiating at least one seismic source, thereby transmitting energy into said predetermined volume of the earth;
   (d) sensing by each of said plurality of seismic sensors energy reflected from within said predetermined volume of the earth;
   (e) transmitting from each of said seismic sensors to a communications satellite a signal representative of said reflected seismic energy sensed thereby; and,

(f) transmitting from said communications satellite to a ground station any of said transmitted representations of said sensed seismic energy.

2. The method of seismic data collection according to claim 1, wherein step (b) comprises the step of:

(b1) transmitting at least one command code from a communications satellite to each of said plurality of seismic sensors, thereby initiating a recording session by each of said plurality of seismic sensors.

3. The method of seismic data collection according to claim 1, wherein step (c) comprises the step of:

(c1) initiating at least one active seismic source, thereby transmitting energy into said predetermined volume of the earth.

4. The method of seismic data collection according to claim 1, wherein step (e) comprises the step of:

(e1) storing within each of said seismic sensors a representation of said reflected seismic energy sensed thereby, and, (e2) transmitting from each of said seismic sensors to a communications satellite a signal representative of said stored reflected seismic energy.

* * * * *